United States Patent [19]

Yamaguchi et al.

[11] Patent Number: 5,160,619
[45] Date of Patent: Nov. 3, 1992

[54] COMPOSITE REVERSE OSMOSIS MEMBRANE AND PRODUCTION THEREOF

[75] Inventors: Tomoo Yamaguchi, Toyohashi; Kenichi Ikeda, Kusatsu, both of Japan

[73] Assignee: Nitto Denko Corporation, Osaka, Japan

[21] Appl. No.: 759,021

[22] Filed: Sep. 13, 1991

[30] Foreign Application Priority Data

Sep. 14, 1990 [JP] Japan .................................. 2-245144
Aug. 28, 1991 [JP] Japan .................................. 3-244647

[51] Int. Cl.⁵ ...................... B01D 69/12; B01D 71/56
[52] U.S. Cl. ............................. 210/500.38; 264/45.1; 264/DIG. 48; 264/DIG. 62
[58] Field of Search .................... 210/490, 654, 500.37, 210/500.38, 500.39, 639; 264/41, 45.1, DIG. 48, DIG. 62

[56] References Cited

U.S. PATENT DOCUMENTS 4,277,344 7/1981 Cadotte .
4,626,468 12/1986 Sundet .
4,872,984 10/1989 Tomaschke .
4,964,998 10/1990 Cadotte et al. ...................... 210/654
5,051,178 9/1991 Uemura et al. ...................... 210/490

FOREIGN PATENT DOCUMENTS 55-147106 11/1980 Japan .
62-121603 11/1987 Japan .
62-258705 11/1987 Japan .
63-218208 1/1989 Japan .
2-187135 7/1990 Japan .

*Primary Examiner*—Frank Sever
*Attorney, Agent, or Firm*—Panitch Schwarze Jacobs & Nadel

[57] ABSTRACT

A composite reverse osmosis membrane composed of a microporous support layer and a thin layer supported thereon, characterized in that the thin layer is made of a crosslinked polyamide which comprises a polyamine component having two or more amino groups in the molecule and an acid component containing a linear aliphatic polyacid halide having two or more halogenated carbonyl groups in the molecule.

6 Claims, No Drawings

COMPOSITE REVERSE OSMOSIS MEMBRANE AND PRODUCTION THEREOF

BACKGROUND OF THE INVENTION

1. Field of the Invention

The present invention relates to a composite reverse osmosis membrane and also to a process for producing the same. More particularly, the present invention relates to a reverse osmosis membrane which is composed of a microporous support and a thin layer of crosslinked polyamide formed thereon and permits a high flux as well as a high salt rejection, and also to a process for producing the same.

2. Description of the Prior Art

There are several kinds of reverse osmosis membranes, for example asymmetric reverse osmosis membranes, and composite reverse osmosis membranes. The latter is composed of a microporous support layer and an active thin layer formed thereon which is capable of selective separation. It is usually produced by forming on a support layer a thin layer of polyamide which is obtained by interfacial polymerization of a polyfunctional aromatic amine and a polyfunctional aromatic acid halide. (See Japanese Laid-open Patent Application Nos. 147106/1980, 121603/1987, 218208/1988, and 187135/1990). The polyamide thin layer may also be obtained by interfacial polymerization of a polyfunctional aromatic amine and a polyfunctional alicyclic acid halide. (See Japanese Laid-open Patent Application Nos. 258705/1987 and 218208/1988).

What is most important technically and economically in desalination of brine and seawater by reverse osmosis is the salt rejection and the flux. The former denotes the ability of the reverse osmosis membrane to reduce the salt concentration in the solution emerging from the membrane. The latter denotes the flow rate of the water which passes through the membrane. For practical desalination by reverse osmosis, the flux should be higher than about 0.4 $m^3/m^2$-day at 55 atm in the case of seawater and about 0.6 $m^3/m^2$-day at 15 atm in the case of brine.

SUMMARY OF THE INVENTION

It is an object of the present invention to provide a composite reverse osmosis membrane and a process for producing the same, said membrane having a high salt rejection as well as a high flux and being capable of desalination at a practically high salt rejection at a comparatively low pressure.

The present invention is embodied in a composite reverse osmosis membrane composed of a microporous support layer and a thin layer supported thereon, characterized in that the thin layer is made of a crosslinked polyamide composed of a polyamine component having two or more amino groups in the molecule, and an acid component containing a linear aliphatic polyacid halide having two or more halogenated carbonyl groups in the molecule.

DETAILED DESCRIPTION OF THE INVENTION

The above-mentioned polyamine component is substantially a monomer compound. It should preferably be a compound having 2 or 3 primary or secondary amino groups in the molecule, of which primary amino groups are preferable. Examples of polyamine are listed below.

Aromatic primary diamines such as m-phenylenediamine and p-phenylenediamine.

Substituted aromatic primary diamines including alkyl (methyl, ethyl, etc.) substituted products such as 2,4-toluenediamine; alkoxy (methoxy, ethoxy, etc.) substituted products such as 4-methoxy-m-phenylenediamine; hydroxy substituted products such as 2,4-diaminophenol (amidol); and halogen substituted products such as 4-chloro-m-phenylene-diamine and 5-chloro-m-phenylenediamine.

Substituted aromatic primary diamines (including carboxyl substituted products) such as 3,5-diaminobenzoic acid.

Aromatic primary diamines having two or more benzene nuclei, such as 3,3,-diamino-diphenylmethane and 1,5-diaminonaphthalene.

Alicyclic primary diamines such as cyclohexanediamine.

Alicyclic secondary diamines such as piperazine.

Aliphatic diamines such as N-phenylethylenediamine and xylylenediamine.

They may be used alone or in combination with one another.

It is also possible to use a trifunctional aromatic amine such as 1,3,5-triaminobenzene, 2,5,6-triaminopyrimidine, and melamine.

The above-mentioned linear aliphatic polyacid halide component, which is used as the acid component in the present invention, is substantially a monomer. This monomer has 2-50 carbon atoms, preferably 2-20 carbon atoms. By "linear" is meant a straight molecular structure with no cyclic structure.

Examples of the linear aliphatic polyacid halides include 1,2,3-propanetricarboxylic acid trichloride, 1,2,4-butanetricarboxylic acid trichloride, 1,2,3,4,-butanetetracarboxylic acid tetrachloride, and 1,2,4,5,-pentanetetracarboxylic acid tetrachloride.

The preferred aliphatic polyacid halides used in the present invention are trifunctional or multifunctional polyacid halides mentioned above. If necessary, they may be used in combination with a difunctional aliphatic acid halide such as glutaryl halide, adipoyl halide, or sebacoyl halide.

According to the present invention, the acid component may contain an aromatic polyacid halide (dihalide or trihalide). Examples of the aromatic polyacid halide include terephthalic acid chloride, isophthalic acid chloride, 1,3-cyclohexanedicarboxylic acid halide, 1,4-cyclohexanedicarboxylic acid halide, trimesic acid halide, and 1,3,5-cyclohexanetricarboxylic acid halide, of which trimesic acid chloride, isophthalic acid chloride, and terephthalic acid chloride are preferable.

According to the present invention, the above-mentioned polyamine and linear aliphatic polyacid halides are made into a thin layer of crosslinked polyamide which is formed on a microporous support layer by interfacial polymerization.

The microporous support layer is not specifically limited so long as it supports the thin layer. It may be made of polysulfone, polyether sulfone (polyarylether sulfone), polyimide, polyvinylidene fluoride, or the like, of which polysulfone and polyarylether sulfone are preferable from the standpoint of chemical, mechanical, and thermal stability. The microporous support layer usually has a thickness of about 25-125 $\mu m$, preferably abut 40-75 $\mu m$.

According to the present invention, the reverse osmosis membrane is produced by forming a thin layer of crosslinked polyamide on the above-mentioned microporous support layer. This process comprises interfacial polymerization of two components. The first component is an aqueous solution containing a polyamine (having two or more amino groups in the molecule) and an amine salt. The second component is a solution of a linear aliphatic polyacid halide (having two or more halogenated carbonyl groups in the molecule) in a water-immiscible organic solvent.

To be more specific, the process for interfacial polymerization is accomplished in two steps. First, a first layer is formed on the microporous support layer from an aqueous solution containing a polyamine and an amine salt (mentioned layer). Then, a second layer is formed on the first layer from a solution in a water-immiscible organic solvent containing the above-mentioned linear aliphatic polyacid halide. After drying by heating, the thin layer of crosslinked polyamide is formed on the microporous support layer.

According to an embodiment of the present invention, the microporous support layer is coated with a first aqueous solution containing an amine salt in an amount of about 0.25-10 wt%, preferably about 1-8 wt%. This aqueous solution should have a pH value of about 5.5-9, preferably about 7-8. Then, the layer of the first aqueous solution is coated with a second aqueous solution containing a polyamino compound. This aqueous solution should have a pH value of about 5-11, preferably about 6-10. The two solutions should be used in such amounts that the molar ratio of the amine salt to the polyamino compound is in the range of about 0.6-1.4.

According to another embodiment of the present invention, the microporous support layer may be coated with an aqueous solution containing both an amine salt and a polyamino compound. The aqueous solution should have a pH value of about 5-11, preferably about 6-10. The molar ratio of the amine salt to the polyamino compound in the aqueous solution should be in the range of about 0.1-4, preferably about 0.6-1.4.

There is no restrictions on the method of coating the microporous support layer with an aqueous solution containing an amine salt or an aqueous solution containing both an amine salt and a polyamine compound. The coating may be accomplished by dipping, spraying, roll coating, or rod coating. After coating, the microporous support layer should be allowed to stand for about 5 seconds to 10 minutes, preferably about 20 seconds to 4 minutes, until the layer of the aqueous solution becomes stable.

The amine salt used in the present invention is disclosed in detail in Japanese Laid-open Patent Application No. 187135/1990. It is not specifically limited so long as it is a water-soluble salt of an amine and an acid. A salt of a tertiary amine and a strong acid is preferable. Examples of the tertiary amine include trimethylamine, triethylamine, and N,N'-dimethylethylamine, of which triethylamine is preferable. The strong acid denotes an acid which forms hydronium ions upon substantially complete reactions with water. Examples of the strong acid include aromatic sulfonic acids, aliphatic sulfonic acids, alicyclic sulfonic acids (e.g., camphorsulfonic acid), $\beta$-trifluoroacetic acid, nitric acid, hydrochloric acid, and sulfuric acid, of which camphorsulfonic acid is preferable.

The process of the present invention does not preclude optionally adding a surface active agent to the aqueous solution containing an amine salt, the aqueous solution containing a polyamino compound, or the aqueous solution containing both of them. The surface active agent is not specifically limited. It includes, for example, sodium dodecylbenzenesulfonate, sodium dodecylsulfate, or sodium laurate. This surface active agent should be used in an amount of about 0.01-0.5 wt%, preferably about 0.1-0.25 wt%.

According to the process of the present invention, the microporous support layer is coated with an aqueous solution containing an amine salt and/or polyamide compound to form a first layer thereon, as mentioned above. Then the first layer is coated with an organic solvent solution containing an aliphatic polyacid halide to form a second layer, as mentioned above. The organic solvent solution should contain an aliphatic polyacid halide in an amount of about 0.05-5 wt%, preferably about 0.1-0.5 wt%. It is important that the aliphatic polyacid halide be dissolved in an organic solvent which is immiscible with water. Examples of the organic solvent include aliphatic hydrocarbons such as hexane and nonane, alicyclic hydrocarbons such as cyclohexane, and halogenated hydrocarbons such as 1,1,2-trichlorotrifluoroethane and Freon (DuPont's trademark), of which $C_5$-12 aliphatic hydrocarbons are preferable.

There are no restrictions on the method of coating the first layer with a polyacid halide solution. The coating may be accomplished by dipping or spraying, for example. After coating, the second layer is allowed to stand for about 5 seconds to 10 minutes, preferably about 20 seconds to 4 minutes, until it becomes stable. The polyamino compound should be used in an amount (in moles) about 5-50 times, preferably about 10-30 times, the amount of the polyacid halide.

As mentioned above, the microporous support layer is coated with an aqueous solution containing an amine and amine salt and then an organic solvent solution containing an aliphatic polyacid halide. The coated product is subsequently heated for drying at about 60-150° C., preferably about 70-130 C., for about 1-10 min preferably about 2-8 minutes. Thus, there is formed a thin layer of crosslinked polyamide. This thin layer usually has a thickness in the range of about 0.05-1$\mu$m, preferably about 0.15-0.5 $\mu$m.

The third embodiment of the present invention involves three steps. The first step consists of forming a first layer on the microporous support layer from an aqueous solution containing a polyamine and an amine salt. The second step consists of forming a second layer on the first layer from a solution in a water-immiscible organic solvent of an acid component containing an aromatic polyacid halide. The first and second steps form a thin layer of crosslinked polyamide on the microporous support layer. The third step consists of reacting a linear aliphatic polyacid halide (mentioned above) with the thin layer, thereby incorporating the aliphatic polyacid halide into the thin layer and increasing the crosslinking density of the thin layer.

The present invention provides a composite reverse osmosis membrane in which the thin layer contains a linear aliphatic polyacid halide as at least one part of the polyacid halide as a constituent thereof. Therefore, it exhibits high desalination performance and high water permeability. It is suitable for desalination of brine and seawater and production of extremely pure water required for the semiconductor industry.

EXAMPLES

The invention will be described in more detail with reference to the following examples, which are not intended to restrict the scope of the invention.

EXAMPLE 1

An aqueous solution was prepared which contains 2.0 wt% m-phenylenediamine, 0.25 wt% sodium laurylsulfate, 4.0 wt% camphorsulfonic acid, and 2.0 wt% triethylamine. The aqueous solution was adjusted to pH 8.0 with hydrochloric acid. The aqueous solution was applied onto a microporous support layer of polysulfone. An excess of the aqueous solution was removed so that the aqueous solution formed a thin layer on the support layer. Onto this thin layer was poured a 0.25 wt% hexane solution of 1,2,3,4-butanetetracarboxylic acid tetrachloride. An excess of the hexane solution was removed so that the hexane solution formed a thin layer on the previously formed layer of the aqueous solution. The support layer with the solution layers formed thereon was heated at 120° C. for 5 minutes to dry the solution layers. Thus, there was obtained a composite reverses osmosis membrane composed of a support layer and a polymer thin layer formed thereon.

This composite reverse osmosis membrane was tested for its performance with a saline solution (pH 6.5) containing 1500 ppm of sodium chloride at 15 kg/cm$^2$. It gave a salt rejection of 95.1% and a flux of 1.71 m$^3$/m$^2$-day, as shown in Table 1.

EXAMPLES 2 to 4

The same procedure as in Example 1 was repeated except that the polyamine and polyacid halide were changed as shown in Table 1. The resulting composite reverse osmosis membrane exhibited the performance as shown in Table 1.

EXAMPLES 5 AND 6

The same procedure as in Example 1 was repeated except that the aqueous solution of polyamine was replaced by one which contains 2.0 wt% m-phenylenediamine and 1.0 wt% amidol and has pH 5.4 and the polyacid halide was replaced by those shown in Table 1. The resulting composite reverse osmosis membrane exhibited the performance as shown in Table 1.

EXAMPLES 7 AND 8

The same procedure as in Examples 5 and 6 was repeated except that the aqueous solution of polyamine was replaced by one which contains 2.0 wt% m-phenylenediamine and 0.5 wt% 3,5-diaminobenzoic acid and has pH 6.7. The resulting composite reverse osmosis membrane exhibited the performance as shown in Table 1.

COMPARATIVE EXAMPLES 1 AND 2

The same procedure as in Example 1 was repeated except that the polyacid halide was replaced by an aromatic polyacid halide. The resulting composite reverse osmosis membrane exhibited the performance as shown in Table 1.

EXAMPLE 9

The reverse osmosis membrane obtained in Comparative Example 2 was coated with a 0.25 wt% hexane solution of glutaric halide, followed by standing at 20° C. for 10 seconds and heating at 120° C. for 5 minutes. The resulting composite reverse osmosis membrane exhibited the performance as shown in Table 1.

EXAMPLE 10

The same procedure as in Example 9 was repeated except that the glutaric chloride was replaced by 1,2,3,4-butanetetracarboxylic acid tetrachloride. The resulting composite reverse osmosis membrane exhibited the performance as shown in Table 1.

TABLE 1

| Example No. | Polyamine | Polyacid halide | Recrosslinked polyacid halide | Salt rejection ratio (%) | Permeation flux (m$^3$/m$^2$-day) |
| --- | --- | --- | --- | --- | --- |
| Example 1 | 2.0 wt % MPD | 0.25 wt % BTC | — | 95.06 | 1.58 |
| Example 2 | 2.0 wt % MPD | 0.15 wt % BTC<br>0.10 wt % IPC | — | 96.59 | 1.02 |
| Example 3 | 2.0 wt % MPD | 0.10 wt % BTC<br>0.15 wt % TMC | — | 98.29 | 1.01 |
| Example 4 | 2.0 wt % MPD | 0.05 wt % BTC<br>0.10 wt % TMC<br>0.15 wt % IPC | — | 99.63 | 0.86 |
| Example 5 | 2.0 wt % MPD<br>1.0 wt % amidol | 0.10 wt % BTC<br>0.03 wt % TMC<br>0.15 wt % IPC | — | 99.34 | 0.57 |
| Example 6 | 2.0 wt % MPD<br>1.0 wt % amidol | 0.10 wt % BTC<br>0.15 wt % IPC | — | 97.55 | 0.93 |
| Example 7 | 2.0 wt % MPD<br>0.5 wt % 3,5-diaminobenzoic acid | 0.10 wt % BTC<br>0.03 wt % TMC<br>0.15 wt % IPC | — | 99.01 | 0.75 |
| Example 8 | 2.0 wt % MPD<br>0.5 wt % 3,5-diaminobenzoic acid | 0.10 wt % BTC<br>0.15 wt % IPC | — | 95.59 | 1.28 |
| Compar. Example 1 | 2.0 wt % MPD | 0.25 wt % TMC | — | 99.40 | 0.53 |
| Compar. Example 2 | 2.0 wt % MPD | 0.10 wt % TMC<br>0.15 wt % IPC | — | 99.18 | 0.68 |
| Example 9 | 2.0 wt % MPD | 0.10 wt % TMC<br>0.15 wt % IPC | 0.25 wt % glutaric chloride | 99.82 | 0.73 |
| Example 10 | 2.0 wt % MPD | 0.10 wt % TMC | 0.25 wt % BTC | 99.81 | 0.74 |

TABLE 1-continued

| Example No. | Polyamine | Polyacid halide | Recrosslinked polyacid halide | Salt rejection ratio (%) | Permeation flux (m³/m²-day) |
|---|---|---|---|---|---|
| | | 0.15 wt % IPC | | | |

Note to Table 1.
MPD: m-phenylenediamine
BTC: 1,2,3,4-butanetetracarboxylic acid tetrachloride
IPC: isophthalic acid chloride
TMC: trimesic acid chloride

WHAT IS CLAIMED IS:

1. A composite reverse osmosis membrane which comprises a microporous support layer and a thin layer formed thereon, characterized in that the thin layer is made of a crosslinked polyamide which comprises a polyamine component having two or more amino groups in the molecule and an acid component containing linear aliphatic polyacid halide having three or more halogenated carbonyl groups in the molecule.

2. A composite reverse osmosis membrane as claimed in claim 1, wherein the acid component further contains an aromatic polyacid halide and/or difunctional aliphatic acid halide.

3. A process for producing a composite reverse osmosis membrane composed of a microporous support layer and a thin layer supported thereon, said process comprising forming on the support layer a first layer of an aqueous solution containing a polyamine and an amine salt, forming on the first layer and a second layer of a solution in a water-immiscible organic solvent of an acid component containing a linear aliphatic polyacid halide having three or more halogenated carbonyl groups, and heating the two layers for drying, thereby forming a thin layer of crosslinked polyamide on the microporous support layer.

4. A process for producing a composite reverse osmosis membrane composed of a microporous support layer and a thin layer supported thereon, said process comprising forming on the support layer a first layer of an aqueous solution containing a polyamine and an amine salt, forming on the first layer a second layer of a solution in a water-immiscible organic solvent of an acid component containing an aromatic polyacid halide, heating the two layers for drying, thereby forming a thin layer of crosslinked polyamide on the microporous support layer, and reacting the thin layer with a linear aliphatic polyacid halide.

5. A composite reverse osmosis membrane as claims in claim 1, wherein the linear aliphatic polyacid halide has 2-20 carbon atoms.

6. A composite reverse osmosis membrane as claimed in claim 5, wherein the linear aliphatic polyacid halide is selected from the group consisting of 1,2,3-propanetricarboxylic acid trichloride, 1,2,4-butanetricarboxylic acid trichloride, 1,2,3,4-butanetetracarboxylic acid tetrachloride, and 1,2,4,5-pentanetetracarboxylic acid tetrachloride.

* * * * *